No. 883,012. PATENTED MAR. 24, 1908.
C. B. GOSNELL & A. M. HARRIS.
BRAKE HEAD.
APPLICATION FILED JUNE 21, 1907.
2 SHEETS—SHEET 1.
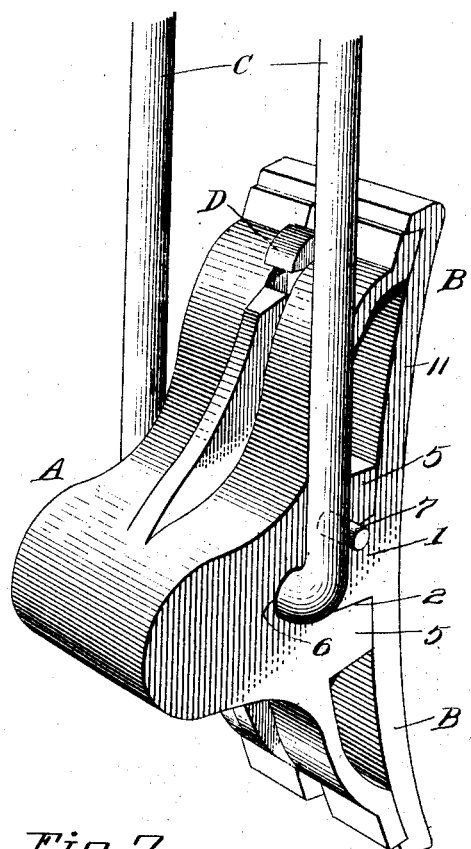
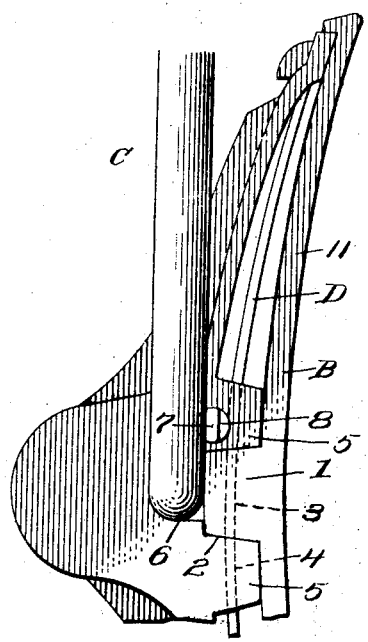
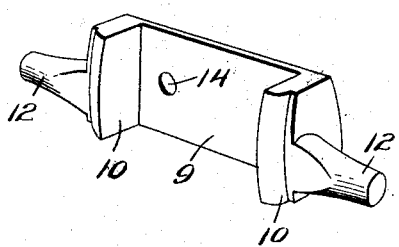
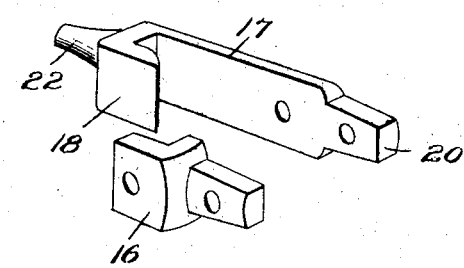
Witnesses
F. C. Gibson.
C. Bradway.
Inventors
Charles B. Gosnell
Adam M. Harris.
By Victor J. Evans
Attorney No. 883,012. PATENTED MAR. 24, 1908.
C. B. GOSNELL & A. M. HARRIS.
BRAKE HEAD.
APPLICATION FILED JUNE 21, 1907.

2 SHEETS—SHEET 2.

Witnesses
F. C. Gibson.
C. Bradway.

Inventors
Charles B. Gosnell.
Adam M. Harris.

By Victor J. Evans
Attorney

UNITED STATES PATENT OFFICE.

CHARLES B. GOSNELL AND ADAM M. HARRIS, OF KEYSER, WEST VIRGINIA.

BRAKE-HEAD.

No. 883,012.  Specification of Letters Patent.  Patented March 24, 1908.

Application filed June 21, 1907. Serial No. 380,173.

*To all whom it may concern:*

Be it known that we, CHARLES B. GOSNELL and ADAM M. HARRIS, citizens of the United States, residing at Keyser, in the county of Mineral and State of West Virginia, have invented new and useful Improvements in Brake-Heads, of which the following is a specification.

The present invention relates to brake shoes for railroad cars, and relates more particularly to safety devices for preventing the brake heads from dropping off their hangers in the event of the shoes breaking or becoming detached, thus preventing the heads from dropping upon the rails and causing derailment of the train.

The invention has for one of its objects to improve and simplify the construction of brakes so as to be comparatively easy and inexpensive to manufacture, thoroughly reliable and efficient in use, and readily adapted to brake heads of standard form.

A further object of the invention is the provision of a brake head having means arranged to engage the hanger or link that suspends the head from the brake beam, said means operating to prevent the head from being jolted off the hanger in case the shoe becomes broken or detached.

Another object of the invention is to provide a safety device in the nature of an attachment, whereby the device can be applied to brake heads of standard form and already in use.

With these objects in view and others, as will appear as the description proceeds, the invention comprises the various novel features of construction and arrangment of parts which will be more fully described hereinafter and set forth with particularity in the claims appended hereto.

Figure 3:
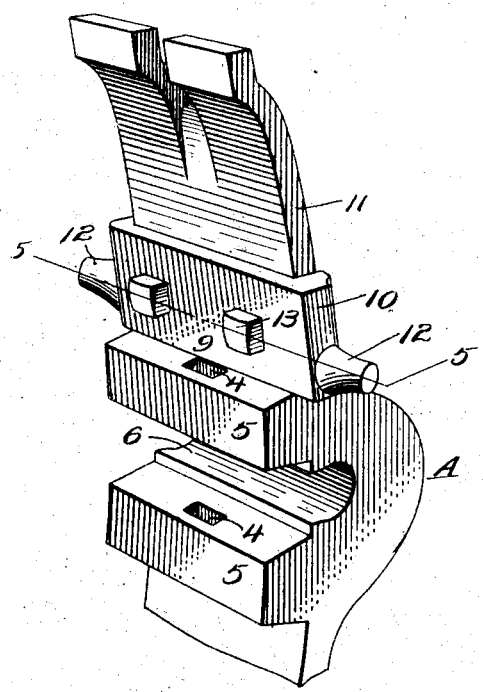
Figure 4:
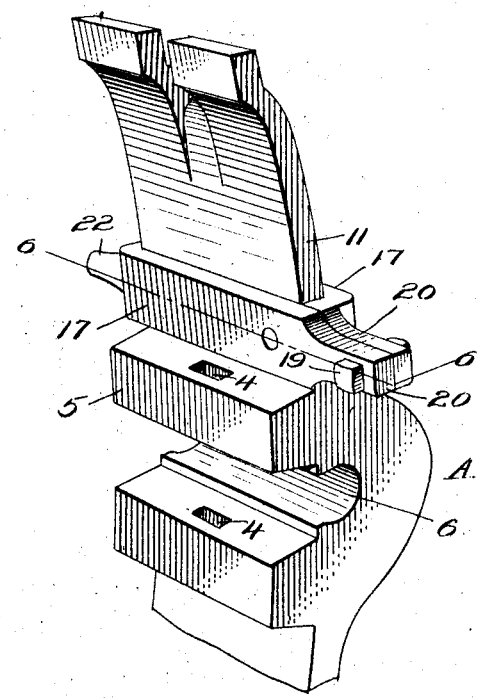
Figure 5:
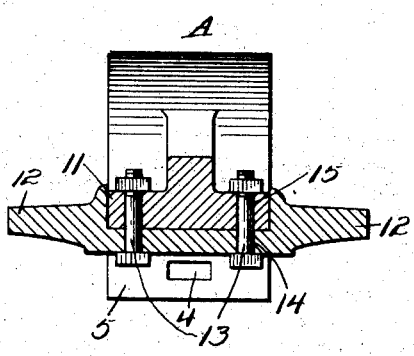
Figure 6:
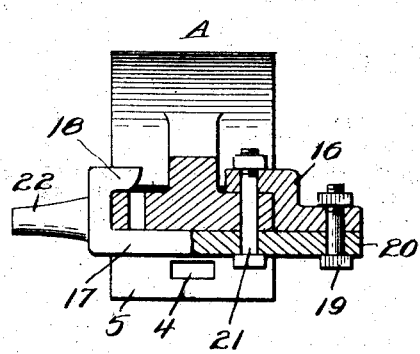

In the accompanying drawings, which illustrate certain of the embodiments of the invention, Figure 1 is a perspective view of a brake provided with one form of retaining means for holding the brake head on the hanger. Fig. 2 is a partial side elevation thereof. Fig. 3 is a perspective view of the head with the retaining means in the form of an attachment. Fig. 4 is a similar view showing the modified form of attachment. Fig. 5 is a section on line 5—5, Fig. 3. Fig. 6 is a section on line 6—6, Fig. 4. Fig. 7 is a perspective view of the attachment shown in Fig. 3. Fig. 8 is a perspective view of the attachment shown in Fig. 4.

Similar reference characters are employed to designate corresponding parts throughout the several views.

Referring to the drawings, A designates the head or body of the brake; B, the shoe; C, the link or hanger; and D, the key for locking the shoe and head on the hanger, these parts being of standard construction. The shoe B has a transverse boss 1 extending from its rear side that engages in a recess 2 of the head A, and the spring key passes through apertures 3 and 4 in the boss 1 and webs 5 on the head that engage on opposite sides of the boss. The inner end of the recess 2 forms a bearing 6 in which engages the hanger C, and since the shoe B closes the open side of the recess, the parts of the brake are held on the hanger in coöperative relation with the wheel of the car. It often happens that the key D breaks or jolts out of place, thereby permitting the shoe to be released, and when this occurs, the head jolts off the hanger and drops on the track directly in front of the succeeding wheel of the car, thus causing a derailment of the train.

To prevent the head from dropping off the hanger, suitable retaining means are employed. According to one form of the invention, the head A is cast or otherwise provided with one or more lugs or projections 7 located slightly above the bearing 6 and in front of the same to engage the front side of the hanger C. These lugs can be made round, as shown in Fig. 1 or provided with flat sides 8, as shown in Fig. 2. In case the key or shoe of the brake became broken, the head would tend to drop off the hanger in a direction away from the adjacent wheel, but the retaining means or keepers prevent this, since the lugs engage the side members of the link or hanger and hold the head in place.

The retaining means is readily adapted for use as an attachment for brake shoes already in use, and one form of the attachment, as shown in Figs. 3, 5 and 7, comprises a plate 9 having end ribs or flanges 10 that are adapted to engage the side edges of the upper arm 11 of the head, and on the ribs are lugs 12 that are adapted to engage the hanger to prevent the head from becoming displaced. The attachment may be secured to the head in any suitable manner, as for instance, by bolts 13 passing through registering apertures 14 and 15 in the plate portion 9 and head A, respectively. The attachment is applied to the head before the shoe and key are applied, as will be readily understood.

In the attachment shown in Figs. 4, 6 and 8, a clamping piece 16 is secured to the plate portion 17, the said clamping piece coöperating with the L-shaped or overhanging lug 18 for holding the attachment on the head, as clearly shown in Fig. 6. In case the head is not provided with bolt-receiving apertures, the attachment can be clamped in place by a single bolt 19, as shown in Fig. 4, the said bolt passing through the terminal extension 20 on the plate portion 17 and through the base of the clamping member. If the head is provided with bolt-receiving apertures, an additional bolt 21, Fig. 6, may be employed for clamping the parts together. In this embodiment, the extension 20 serves as one of the retaining lugs or keepers, and on the hook-shaped extension 18 is formed the other retaining lug or keeper 22.

From the foregoing description, taken in connection with the accompanying drawings, the advantages of the construction and of the method of operation will be readily apparent to those skilled in the art to which the invention appertains, and while we have described the principle of operation of the invention, together with the apparatus which we consider to be the best embodiment thereof, we desire to have it understood that the apparatus shown is merely illustrative, and that such changes may be made when desired as are within the scope of the claims.

Having thus described the invention, what we claim is:—

1. A brake comprising a head, a shoe, a key for detachably connecting the shoe with the head, and a hanger on which the head is held by the shoe, in combination with means independent of the key for preventing the head from becoming detached from the hanger in the event of the key dropping out or detachment of the shoe.

2. A brake comprising a head, a shoe, means for detachably connecting the shoe with the head, and a hanger on which the head is held by the shoe, in combination with means on the head independent of the first-mentioned means for engagement with the hanger to prevent the head from dropping off the latter in the event of detachment of the shoe.

3. The combination of a hanger, a brake pivotally mounted thereon and including a head, and means on the head located adjacent the portion of the hanger on which the brake swings for preventing accidental detachment of the head.

4. The combination of a link-shaped hanger, a brake comprising a head and shoe detachably connected and mounted on the link, and laterally extending members on the head arranged to engage the link for preventing the head from dropping off the latter.

5. The combination of a head, a shoe, a key for connecting the shoe and head, and a hanger on which the head is mounted, with an attachment applied to the head for preventing the latter from dropping off the hanger in the event of breakage or displacement of the key.

6. An attachment for brakes comprising a body, oppositely extending hanger-engaging members on the body, and means for attaching the body to a brake.

7. An attachment of the character described comprising a body having a hook-shaped extension at one end, a clamping piece coöperating with the said extension for securing the attachment to a brake, and hanger-engaging means on the said body.

8. The combination of a brake head, a member extending across the same, fastening devices for securing the member to the head, and devices on the extremities of the member for engaging the hanger of a brake.

In testimony whereof, we affix our signatures in presence of two witnesses.

CHARLES B. GOSNELL.
ADAM M. HARRIS.

Witnesses:
HARRY G. FISHER,
J. A. SHARPLESS.